March 5, 1940. J. E. ELLOR 2,192,730
EXHAUST PIPE FOR INTERNAL COMBUSTION ENGINES OF AIRCRAFT
Filed March 21, 1939

Patented Mar. 5, 1940

2,192,730

UNITED STATES PATENT OFFICE 2,192,730

EXHAUST PIPE FOR INTERNAL COMBUSTION ENGINES OF AIRCRAFT

James Edwin Ellor, Derby, England, assignor to Rolls-Royce Limited, Derby, England, a British company Application March 21, 1939, Serial No. 263,228
In Great Britain September 24, 1937

5 Claims. (Cl. 60—35.6)

The invention is for exhaust pipes for internal combustion engines of aircraft and has for its object to discharge the exhaust gases from the bank of cylinders by a system that shall be comparatively silent, oppose comparatively small resistance to the air through which the aircraft is travelling and have good flame damping properties.

It is known that if exhaust gases of a high speed aircraft have their pressure raised above the local atmospheric pressure and are discharged backwardly through restricted nozzles at at least twice the speed of the airstream in the neighbourhood of their discharge, the loss of power due to the back pressure of the gases may be outweighed by the thrust produced by the gases and a further object of this invention is to enable such gain to be realised in circumstances where the necessary factors are present.

The invention consists essentially in providing a group of the expansion boxes for the cylinders of a bank, the boxes being arranged one behind the other and the group shaped so as to present a flattened approximately streamline shape to the airstream through which the aircraft is travelling with nozzles discharging the exhaust gases from the boxes into the airstream passing the aircraft, the said nozzles projecting from the aircraft and pointing backward in the opposite direction to the direction of travel of the aircraft, each nozzle being tapered so as to increase the kinetic energy of the gases leaving the same at the expense of the pressure of such gases, the nozzles may be crescent shaped or oval shaped, there may be a single nozzle to each box or more than one nozzle, the expansion box may be interconnected so as to even up the pressure between them.

An embodiment of this invention is illustrated in the accompanying drawing.

Figure 1:
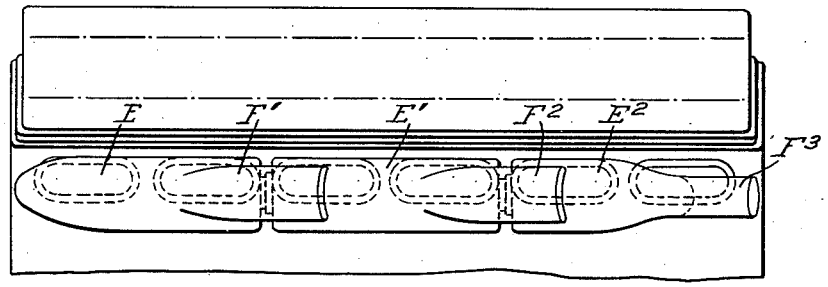
Figure 2:
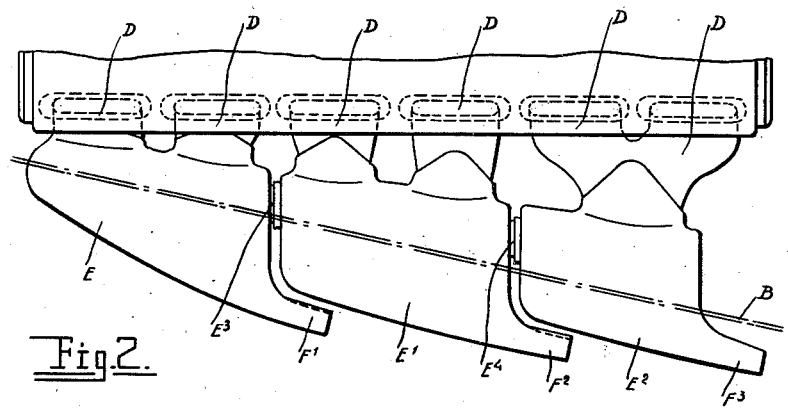
Figure 3:
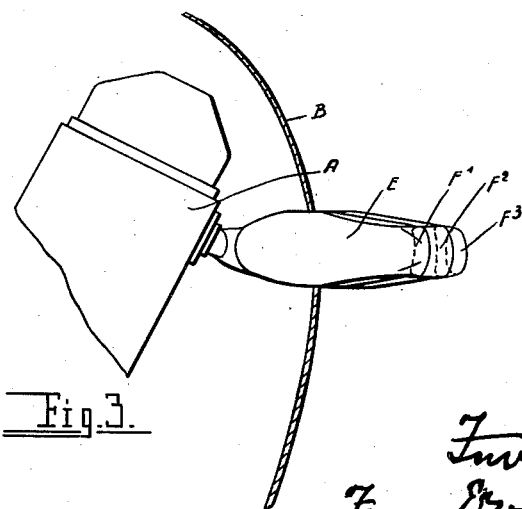

Figure 1 is a view of the device from the side, Figure 2 from above and Figure 3 from the front.

The device illustrated in the drawing serves an engine having two banks of cylinders arranged in a V one of the banks being shown at A. The engine is contained in a cowling shown at B. Each bank has six cylinders, the exhaust gases from which pass into short pipes D. Three expansion boxes are provided E, E¹ and E² connected together by short lengths of piping E³ and E⁴, and each of these collects the gases from two of the pipes D. Each box has a rearwardly projecting nozzle F¹, F² and F³ with orifices shaped as shown in Figure 3. These nozzles are tapered and restricted and operate to increase the kinetic energy of the gases at the point of discharge. The group of boxes together forms a body of flattened approximately streamline shape except for the necessary departure therefrom due to accommodating the discharge orifices.

In the example shown only a part of the streamline member lies outside the cowling. It may, however, be wholly outside.

The expansion boxes will act as silencers, the rearwardly projecting nozzles will cause comparatively little disturbance on the external airstream, they will have good flame damping properties and may actually cause an increase of thrust on the aircraft in the circumstances before mentioned.

In the example illustrated the expansion boxes are all inter-connected to even up slight differences of pressure ruling in them. These connections might however be dispensed with.

What I claim is:

1. In an internal combustion engine of an aircraft having at least one bank of cylinders and ports in the cylinders of the bank for the escape of exhaust gases therefrom, an exhaust discharge arrangement comprising a group of expansion boxes arranged one behind the other, pipes connecting said exhaust ports with the expansion boxes and nozzles discharging the exhaust gases from the boxes into the airstream passing the aircraft, the said nozzles projecting from the aircraft and pointing backward in the opposite direction to the direction of travel of the aircraft and each being tapered so as to increase the kinetic energy of the gases leaving the same at the expense of the pressure of such gases, the group of boxes being shaped so as to present a flattened approximately streamline shape to the airstream through which the aircraft is travelling.

2. In an internal combustion engine of an aircraft having at least one bank of cylinders and ports in the cylinders of the bank for the escape of exhaust gases therefrom an exhaust discharge arrangement comprising a group of expansion boxes arranged one behind the other, pipes connecting said exhaust ports with the expansion boxes, and nozzles discharging the exhaust gases from the boxes into the airstream passing the aircraft, the said nozzles projecting from the aircraft and pointing backward in the opposite direction to the direction of travel of the aircraft and each being tapered so as to increase the kinetic energy of the gases leaving the same at the expense of the pressure of such gases, at least one of the nozzles being crescent shaped so as to decrease the amount by which they project from the aircraft, the group of boxes being shaped so as to present a flattened approximately streamline shape to the airstream through which the aircraft is travelling.

3. In an internal combustion engine of an aircraft having at least one bank of cylinders and ports in the cylinders of the bank for the escape of exhaust gases therefrom, an exhaust discharge arrangement comprising a group of expansion boxes arranged one behind the other, pipes connecting said exhaust ports with the expansion boxes, and nozzles discharging the exhaust gases from the boxes into the airstream passing the aircraft, the said nozzles projecting from the aircraft and pointing backward in the opposite direction to the direction of travel of the aircraft and each being tapered so as to increase the kinetic energy of the gases leaving the same at the expense of the pressure of such gases, at least one of the nozzles being oval shaped so as to decrease the amount by which they project from the aircraft, the group of boxes being shaped so as to present a flattened approximately streamline shape to the airstream through which the aircraft is travelling.

4. In an internal combustion engine of an aircraft having at least one bank of cylinders and ports to the cylinders of the bank for the escape of exhaust gases therefrom, an exhaust discharge arrangement comprising a group of expansion boxes arranged one behind the other, pipes connecting said exhaust ports with the expansion boxes, and nozzles discharging the exhaust gases from the boxes into the airstream passing the aircraft, the said nozzles projecting from the aircraft and pointing backward in the opposite direction to the direction of travel of the aircraft and each being tapered so as to increase the kinetic energy of the gases leaving the same at the expense of the pressure of such gases, the group of boxes being shaped so as to present a flattened approximately streamline shape to the airstream through which the aircraft is travelling, with pipes interconnecting the expansion boxes.

5. In an internal combustion engine of an aircraft having at least one bank of cylinders and ports to the cylinders of the bank for the escape of exhaust gases therefrom, an exhaust discharge arrangement comprising a group of expansion boxes arranged one behind the other, pipes connecting said exhaust ports with the expansion boxes, pipes interconnecting the said expansion boxes and a nozzle from each box discharging the exhaust gases from the box into the airstream passing the aircraft, the said nozzles projecting from the aircraft and pointing backward in the opposite direction to the direction of travel of the aircraft and each being tapered so as to increase the kinetic energy of the gases leaving the same at the expense of the pressure of such gases, and the group of boxes being shaped so as to present a flattened approximately streamline shape to the airstream through which the aircraft is travelling.

JAMES EDWIN ELLOR.